(12) United States Patent
Zhang et al.

(10) Patent No.: US 9,857,530 B2
(45) Date of Patent: Jan. 2, 2018

(54) PACKAGING SYSTEMS AND METHODS FOR OPTICAL LIGHT PIPES

(71) Applicant: Halliburton Energy Services, Inc., Houston, TX (US)

(72) Inventors: Wei Zhang, Houston, TX (US); Robert Atkinson, Houston, TX (US); Michael Pelletier, Houston, TX (US); William Soltmann, Houston, TX (US); Christopher Michael Jones, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 135 days.

(21) Appl. No.: 14/233,430

(22) PCT Filed: Mar. 26, 2013

(86) PCT No.: PCT/US2013/033815
§ 371 (c)(1),
(2) Date: Jan. 17, 2014

(87) PCT Pub. No.: WO2014/158137
PCT Pub. Date: Oct. 2, 2014

(65) Prior Publication Data
US 2014/0294356 A1  Oct. 2, 2014

(51) Int. Cl.
*G02B 6/10* (2006.01)
*G02B 6/44* (2006.01)
*G02B 6/42* (2006.01)

(52) U.S. Cl.
CPC ............... *G02B 6/10* (2013.01); *G02B 6/443* (2013.01); *G02B 6/4296* (2013.01)

(58) Field of Classification Search
CPC ........................................................ G02B 6/10
See application file for complete search history.

(56) References Cited

U.S. PATENT DOCUMENTS 3,641,332 A * 2/1972 Reick .................. A61B 1/07
  264/1.24
4,496,211 A  1/1985 Daniel
4,805,984 A * 2/1989 Cobb, Jr. ................. G02B 5/12
  359/592

(Continued)

FOREIGN PATENT DOCUMENTS

WO           9006528 A1    6/1990
WO   WO-2011/156645 A1   12/2011
(Continued)

OTHER PUBLICATIONS

International Search Report and Written Opinion for PCT/US2013/033815 dated Dec. 16, 2013.
(Continued)

*Primary Examiner* — Daniel Petkovsek
(74) *Attorney, Agent, or Firm* — McDermott Will & Emery LLP

(57) ABSTRACT

Disclosed are robust packaging systems and methods for optical elements used in optical light pipes. One optical light pipe includes a housing having opposing first and second ends and a body that extends therebetween, an optical element arranged within the housing, and a reflective coating applied about an outer surface of the optical element.

20 Claims, 1 Drawing Sheet

(56) References Cited

U.S. PATENT DOCUMENTS

| | | | |
|---|---|---|---|
| 4,805,987 A * | 2/1989 | Laakmann | G02B 6/032 385/125 |
| 4,913,505 A * | 4/1990 | Levy | G02B 6/032 264/1.24 |
| 5,810,463 A * | 9/1998 | Kawahara et al. | 362/601 |
| 5,815,627 A * | 9/1998 | Harrington | G02B 6/032 385/125 |
| 6,198,531 B1 | 3/2001 | Myrick et al. | |
| 6,347,176 B1 * | 2/2002 | Hawryluk | G02B 6/4206 385/133 |
| 6,529,276 B1 | 3/2003 | Myrick | |
| 6,612,729 B1 * | 9/2003 | Hoffman | F21S 6/00 362/20 |
| 6,771,870 B2 * | 8/2004 | Strobl | G02B 27/09 362/257 |
| 7,123,844 B2 | 10/2006 | Myrick | |
| 7,220,005 B2 * | 5/2007 | Yamasaki | G03B 21/26 348/748 |
| 7,228,052 B1 * | 6/2007 | Lin | 385/146 |
| 7,748,874 B2 * | 7/2010 | Cho | G02B 5/045 362/339 |
| 7,834,999 B2 | 11/2010 | Myrick et al. | |
| 7,911,605 B2 | 3/2011 | Myrick et al. | |
| 7,920,258 B2 | 4/2011 | Myrick et al. | |
| 8,049,881 B2 | 11/2011 | Myrick et al. | |
| 8,208,147 B2 | 6/2012 | Myrick et al. | |
| 8,358,418 B2 | 1/2013 | Myrick et al. | |
| 8,720,040 B2 * | 5/2014 | Hongo | G02B 6/032 29/592.1 |
| 2005/0179873 A1 | 8/2005 | Yamasaki et al. | |
| 2005/0277811 A1 * | 12/2005 | Richards et al. | 600/184 |
| 2009/0027914 A1 | 1/2009 | Wu | |
| 2010/0091515 A1 | 4/2010 | Goto et al. | |
| 2011/0075105 A1 | 3/2011 | Ouyang et al. | |
| 2012/0039086 A1 | 2/2012 | Jansen et al. | |
| 2012/0147624 A1 | 6/2012 | Li et al. | |
| 2012/0281427 A1 | 11/2012 | Shakespeare et al. | |
| 2013/0286399 A1 | 10/2013 | Freese et al. | |

FOREIGN PATENT DOCUMENTS

| | | |
|---|---|---|
| WO | 2012129334 A1 | 9/2012 |
| WO | 2014158137 A1 | 10/2014 |

OTHER PUBLICATIONS

Extended European Search Report for EP 13880201 dated Apr. 18, 2016.
Australian Notice of Acceptance from Australian Patent Application No. 2013384290, dated Mar. 24, 2017.

* cited by examiner

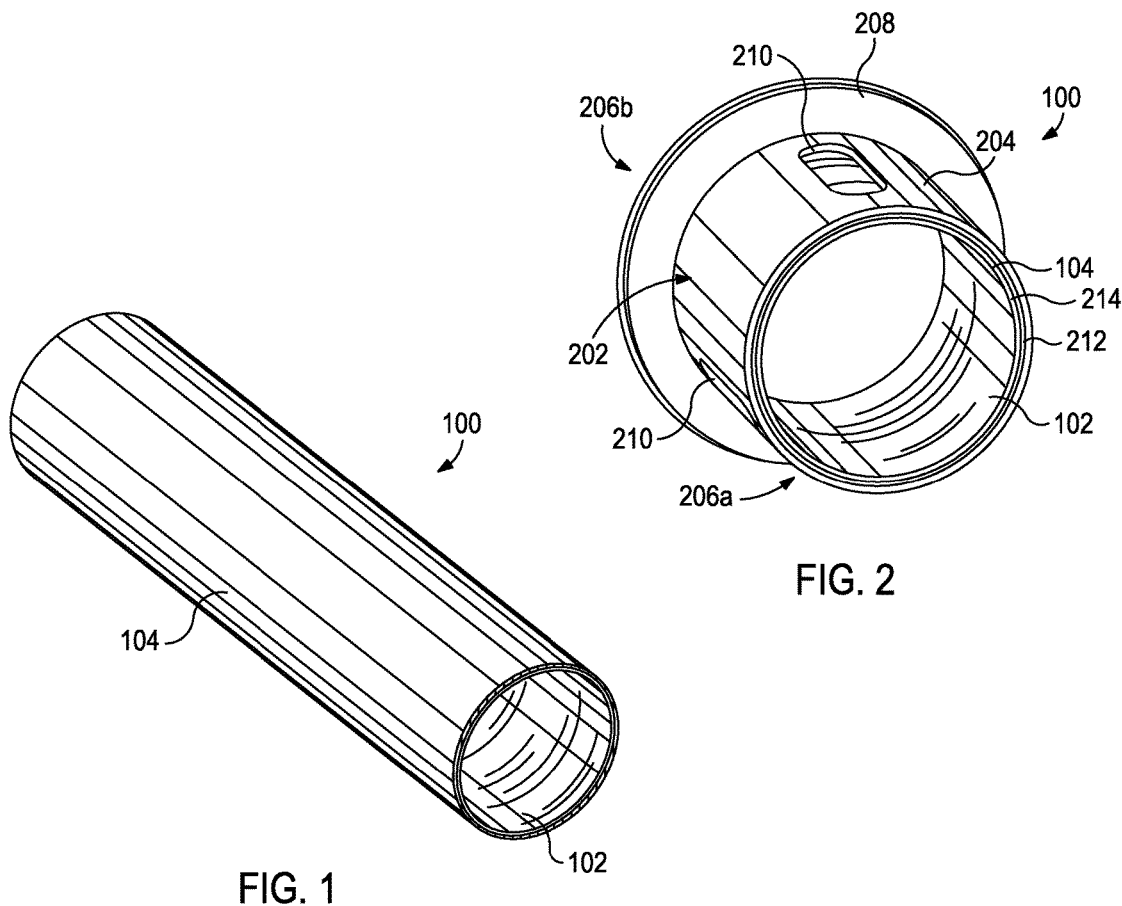
FIG. 2
FIG. 1
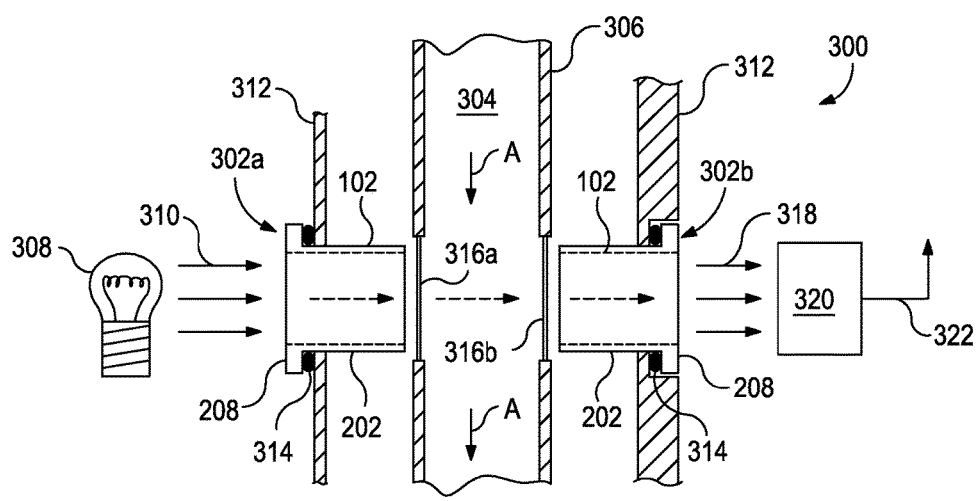
FIG. 3

PACKAGING SYSTEMS AND METHODS FOR OPTICAL LIGHT PIPES

This application is a National Stage entry of and claims priority to International Application No. PCT/US2013/033815, filed on Mar. 26, 2013.

BACKGROUND

The present invention relates to optical light pipes and, more particularly, to robust packaging systems and methods for optical elements used in optical light pipes.

Optical light pipes are a type of optical waveguide that utilize the phenomena of total internal reflection to direct light from one point to another. Optical light pipes are convenient for bending light, directing light around corners, splitting a light beam for delivery to a plurality of destinations, precisely directing light from a specific source to a specific destination, transmitting light signals through environments otherwise hostile to light transmission, insulating light beams from outside interference or scattering, and like applications. A typical optical light pipe will usually include an optical element, such as an optical crystal or the like, that is used as a light guide and for conveying electromagnetic radiation (e.g., light) from one end of the optical light pipe to the other.

When used in severe environments, such as downhole environments in oil and gas industry applications, the optical element will typically be packaged or otherwise protected using soft silicone pads that are wrapped circumferentially about the optical element. The silicone pads advantageously serve to absorb unwanted vibrations sustained by the optical light pipe and allow the optical light pipe to thermally expand and contract without damaging the optical element. Such soft packaging material, however, tends to violate or otherwise disrupt the total internal reflection boundary conditions of the optical element and therefore interferes with the efficient transmission of electromagnetic radiation therethrough. As a result, efficiency of the transmission of electromagnetic radiation through the optical light pipe can become a function of the packaging material and how tight the package may be squeezed.

SUMMARY OF THE INVENTION

The present invention relates to optical light pipes and, more particularly, to robust packaging systems and methods for optical elements used in optical light pipes.

In some embodiments, an optical light pipe is disclosed and may include a housing having opposing first and second ends and a body that extends therebetween, an optical element arranged within the housing, and a reflective coating applied about an outer surface of the optical element.

In other embodiments, a method of transmitting electromagnetic radiation in an optical light pipe is disclosed. The method may include receiving electromagnetic radiation at a first end of an optical element arranged within a housing, conveying the electromagnetic radiation from the first end to a second end of the optical element, and maintaining the electromagnetic radiation within the optical element with a reflective coating applied about an outer surface of the optical element.

The features and advantages of the present invention will be readily apparent to those skilled in the art upon a reading of the description of the embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates an isometric view of an exemplary optical light pipe, according to one or more embodiments.

FIG. 2 illustrates an isometric view of the optical light pipe of FIG. 1 including an exemplary housing, according to one or more embodiments.

FIG. 3 illustrates an exemplary optical computing device that may employ one or more optical light pipes, according to one or more embodiments.

DETAILED DESCRIPTION

The present invention relates to optical light pipes and, more particularly, to robust packaging systems and methods for optical elements used in optical light pipes.

The embodiments disclosed herein provide optical light pipes that maintain total or near total internal reflection. This may be accomplished by applying a reflective coating to the outer surface of the optical element. The reflective coating may serve to homogenize the electromagnetic radiation that is transmitted through the optical light pipe such that most if not all of the electromagnetic radiation is maintained from one end of the optical light pipe to the other. As a result, more electromagnetic radiation is conveyed from a light source to a substance being analyzed, and from the substance to a detector that quantifies a signal representative of the substance. Accordingly, any packaging associated with the optical light pipe is less likely to interfere with the effective transmission of the electromagnetic radiation.

Referring to FIG. 1, illustrated is an isometric view of an exemplary optical light pipe 100, according to one or more embodiments. As used herein, the term "optical light pipe" refers to an optical device or mechanism capable of directing electromagnetic radiation from a specific source to a specific destination and generally insulating the electromagnetic radiation from outside interference or spectral scattering. As used herein, "electromagnetic radiation" refers to radio waves, microwave radiation, infrared and near-infrared radiation, visible light, ultraviolet light, X-ray radiation and gamma ray radiation. In some embodiments, the optical light pipe 100 may be in the form of an elongate rod, as illustrated. In other embodiments, however, the optical light pipe 100 may encompass other geometric shapes, such as polygonal rods or the like, without departing from the scope of the disclosure.

As illustrated, the optical light pipe 100 may include an optical element 102 and a reflective coating 104 applied about the outer surface of the optical element 102. In some embodiments, the optical element 102 may be an optical crystal. In other embodiments, however, the optical element 102 may be a lens, a prism, relay optics, combinations thereof, and the like. In yet other embodiments, the optical element 102 may be replaced with air or a vacuum, without departing from the scope of the disclosure. The optical element 102 may be made of a variety of materials configured to allow electromagnetic radiation to be transmitted therethrough with little or no dissipation or degradation in signal quality. In some embodiments, the optical element 102 may be made of calcium fluoride ($CaF_2$ or fluorite) or sapphire. In other embodiments, however, the optical element 102 may be from a variety of materials including, but not limited to, quartz, calcite, diamond, silicon, germanium, zinc selenide, zinc sulfide, crystalline materials, polycrystalline materials, hot or cold-pressed powders, or various plastics such as polycarbonate, polymethylmethacrylate (PMMA), polyvinylchloride (PVC), combinations thereof, and the like.

The reflective coating 104 may be applied on the outer surface of the optical element 102 in order to generate a barrier layer that exhibits a constant index of refraction and provides total internal reflection along the axial length of the optical light pipe 100. In some embodiments, the reflective coating 104 may be a thin layer of metallic material. Exemplary materials for the reflective coating 104 may include, but are not limited to, gold, silver, aluminum, nickel, chromium, copper, molybdenum, germanium, combinations thereof, and the like. In some embodiments, the reflective coating 104 may include two or more layers of such reflective materials, such as a nickel layer bonded to the outer surface of the optical element 102 and a layer of gold bonded exterior to the nickel. As will be discussed in greater detail below, such materials may prove advantageous in mechanically attaching the optical element 102 to other components of the optical light pipe 100.

Depending on the particular application, the material of the reflective coating 104 may be selected or otherwise designed to be highly reflective of the particular electromagnetic radiation that will be transmitted through the optical element 102. In other embodiments, the material of the reflective coating 104 may be selected based on the particular wavelength of electromagnetic radiation that will be transmitted. For example, a silver reflective coating 104 may prove advantageous for reflecting ultraviolet through visible electromagnetic radiation. On the other hand, an aluminum, copper or gold reflective coating 104 may prove advantageous in reflecting electromagnetic radiation transmitted at deeper infrared wavelengths. In other embodiments, however, suitable reflective characteristics for the reflective coating 104 may be achieved by providing a reflective coating 104 having a refractive index that is different than that of the optical element 102.

The reflective coating 104 may be applied to the outer surface of the optical element 102 using any number of techniques or processes known to those skilled in the art. In some embodiments, for example, the reflective coating 104 may be applied using one or more techniques such as, but not limited to, metalizing, vacuum metalizing, thermal spray processing, electroplating, thin-film deposition, atomic layer deposition, vapor deposition, chemical vapor deposition, electroless plating, sputtering, mirroring, combinations thereof, and the like.

Referring now to FIG. 2, with continued reference to FIG. 1, illustrated is an isometric view of the optical light pipe 100 including an exemplary housing 202, according to one or more embodiments. As illustrated, the axial length of the optical light pipe 100, as compared to FIG. 1, has been reduced in order to be used in a particular optical measurement application. Those skilled in the art will readily recognize that the axial length of the optical light pipe 100 may be any length required for the particular application, without departing from the scope of the disclosure.

In one or more embodiments, the housing 202 may include a generally elongate body 204 having a first end 206a and a second end 206b. The body 204 may be configured to receive and secure the optical element 102 therein. In some embodiments, as illustrated, the housing 202 may be cylindrical or a generally hollow cylinder. In other embodiments, however, the housing 202 may be any other geometric shape (e.g., polygonal, etc.) configured to receive a correspondingly-shaped optical element 102, without departing from the scope of the disclosure. In at least one embodiment, the housing 202 may be made of metal, such as stainless steel. In other embodiments, however, the housing 202 may be made of other materials including, but not limited to, high-strength plastics, ceramics (e.g., glass ceramics), composites, combinations thereof, and the like.

The housing 202 may include a flange 208 at either the first or second ends 206a,b (shown at the second end 206b) of the body 204. As will be apparent to those skilled in the art, the flange 208 may prove advantageous for several reasons. For instance, the flange 208 may provide a location to couple or otherwise attach the optical light pipe 100 to a structural member of a larger system, such as an optical computing device. As part of such a system, the optical light pipe 100 may be used in environments that exhibit fluctuating and extreme temperatures, which may cause the optical element 102 to thermally expand and/or contract. Such environments may also be prone to high vibration, which could also adversely affect and even damage the optical element 102. By securing the optical light pipe 100 at the flange 208, instead of about the outer surface of the housing 202, the optical element 102 is not unduly restricted within the housing 202, thereby allowing the optical element 102 to thermally expand when needed. Moreover, attachment at the flange 208, as opposed to an attachment that physically contacts the optical element 102, or otherwise restricts it within the housing 202, may allow the optical light pipe 100 to be used in high vibration environments without risking inadvertent failure or cracking of the optical element 102.

Other mechanical features may be added to the housing 202 to facilitate installation and protection of the same. For example, in at least one embodiment, one or more tapped holes (not shown) may be provided on the flange 208 such that the housing 202 may be mechanically fastened to a larger system (i.e., an optical computing device). Additionally, the flange 208 may further include one or more features to aid in the extraction of the same after use for maintenance or cleaning. For example, such a feature could encompass a notch or the like defined on the outer rim of the flange 208. In other embodiments, such a feature could encompass a hole defined in the flange 208 and threaded such that it can be used as a jack screw or the like. This may prove especially advantageous in embodiments where the flange 208 is robust or otherwise fixed as a deformable metal to metal seal.

The housing 202 may further define one or more windows 210 (two shown) along the body 204. While only two windows 210 are depicted in FIG. 2, it will be appreciated that more or less than two windows 210 may be used, without departing from the scope of the disclosure. As illustrated, the windows 210 may be defined as elongate slots in the body 204. In other embodiments, however, the windows 210 may be formed in any other geometric shape or configuration including, but not limited to, spiral cuts, circular or oval perforations, polygonal perforations, and the like. In operation, the windows 210 may be configured to relieve thermal stress that may be generated between the optical element 102 and the housing 202 as a result of a thermal expansion mismatch between the two components. In at least one embodiment, however, the material of the housing 202 may be selected to have thermal characteristics, such as a coefficient of thermal expansion, similar to those of the optical element 102 to thereby reduce or otherwise minimize thermally induced effects, such as thermally induced stresses, between the two components.

The optical element 102 may be secured within the housing 202 such that the optical element 102 and the housing 202 are generally coaxial. In other embodiments, however, the optical element 102 may be secured within the housing 202 such that the optical element 102 and the housing 202 are generally eccentric or tilted, without departing from the scope of the disclosure. A variety of coupling or attachment techniques may be used to secure the optical element 102 within the housing 202. In some embodiments, for example, the housing 202 may be welded or otherwise brazed to the optical element 102. In particular, the housing 202 may be welded, brazed, or soldered to the reflective coating 104 applied to the outer surface of the optical element 102. In other embodiments, where the housing 202 is made of a metal material, metallization-bonding with the housing 202 can be used.

In yet other embodiments, the optical element 102 may be secured to the housing 202 using an industrial adhesive or cement. For example, in at least one embodiment, the optical element 102 may be secured to the housing 202 using a high-temperature, low-expansion epoxy 212. The epoxy 212 may be disposed on the outer surface of the optical element 102 and/or the inner surface of the housing 202, and then the optical element 102 may be inserted longitudinally into the housing 202. Once inserted, the optical element 102 may be rotated so as to spread the epoxy 212 over the entire outer surface and otherwise result in a full surface adhesive coating exterior to the reflective coating 104. In some embodiments, the windows 210 may be used to back fill or otherwise apply additional epoxy 212 after inserting the optical element 102, thereby ensuring an equal annular fill of the epoxy 212 about the entirety of the optical element 102. Once hardened, as will be appreciated, the epoxy 212 applied at each window 210 may extend at least partially into the window 210, thereby serving as a locking key way, or the like, that may resist inadvertent rotation or axial translation of the optical element 102 with respect to the housing 202.

When the optical element 102 is suitably secured within the housing 202, one or both of the ends of the optical element 102 may be flush with the first and/or second ends 206a,b of the housing 202. In other embodiments, however, one or both of the ends of the optical element 102 may be recessed within the first and/or second ends 206a,b of the housing 202. In yet other embodiments, one or both of the ends of the optical element 102 may protrude from the first and/or second ends 206a,b of the housing 202.

In some embodiments, an energy absorbing layer 214 may interpose the optical element 102 and the housing 202. In particular, the energy absorbing layer 214 may be disposed about all or a portion of the exterior of the reflective coating 104. The energy absorbing layer 214 may be a layer of silicone, an elastomeric substance, or other generally soft material configured to reduce vibration affects on the optical element 102. Since the reflective coating 104 provides total internal reflection along the length of the optical light pipe 100, the transmission characteristics of the optical element 102 will generally not be adversely affected by the addition of the energy absorbing layer 214.

Referring now to FIG. 3, illustrated is an exemplary optical computing device 300 that may embody or otherwise employ one or more principles of the present disclosure, according to one or more embodiments. As used herein, the term "optical computing device" refers to an optical device that is configured to receive an input of electromagnetic radiation and produce an output of optically interacted electromagnetic radiation after having optically interacted with a substance, such as a fluid. The electromagnetic radiation that optically interacts with the substance is changed by such interaction so as to be readable by a detector, such that an output of the detector can be correlated to a characteristic or property of the substance. As used herein, "optically interact" refers to the reflection, transmission, scattering, diffraction, or absorption of electromagnetic radiation either on, through, or from a substance.

As illustrated, the optical computing device 300 may include a first optical light pipe 302a and a second optical light pipe 302b. The first and second optical light pipes 302a,b may be substantially similar to the optical light pipe 100 of FIGS. 1 and 2 and therefore may be best understood with reference thereto where like numerals will represent like elements not described again in detail. The optical computing device 300 may be configured to monitor a substance, such as a fluid 304, contained or otherwise flowing within an exemplary flow path 306. The fluid 304 may be any substance that is capable of flowing, including particulate solids, liquids, gases, slurries, emulsions, powders, muds, glasses, mixtures, combinations thereof, and the like.

The flow path 306 may be any route through which the fluid 304 is capable of being transported between two points. In some cases, the flow path 306 may not be continuous or otherwise contiguous between the two points. Exemplary flow paths 306 include, but are not limited to, a flowline, a pipeline, a production tubular or tubing, an annulus defined between a wellbore and a pipeline, a hose, a process facility, a storage vessel, a tanker, a railway tank car, a transport ship or vessel, a trough, a stream, a subterranean formation, combinations thereof, or the like. It should be noted that the term "flow path" does not necessarily imply that the fluid 304 is flowing therein, rather that the fluid 304 may be capable of being transported or otherwise flowable therethrough. As illustrated, the fluid 304 in the flow path 306 may be flowing in the general direction indicated by the arrows A (i.e., from upstream to downstream). Portions of the flow path 306 may be arranged substantially vertical, substantially horizontal, or any directional configuration therebetween, without departing from the scope of the disclosure.

The optical computing device 300 may include an electromagnetic radiation source 308 configured to emit or otherwise generate electromagnetic radiation 310. The electromagnetic radiation source 308 may be any device capable of emitting or generating electromagnetic radiation, as defined herein. For example, the electromagnetic radiation source 308 may be a light bulb, a light emitting diode (LED), a laser, a blackbody, a photonic crystal, an X-Ray source, combinations thereof, or the like. In some embodiments, a lens (not shown), or any other type of optical device configured to transmit or otherwise convey electromagnetic radiation, may be arranged to collect or otherwise receive the electromagnetic radiation 310 and direct a beam of the same toward and into the first optical light pipe 302a.

In some embodiments, one or both of the first and second optical light pipes 302a,b may be secured or otherwise coupled to corresponding structural members 312 of the optical computing device 300. As generally described above, the flanges 208 of each optical light pipe 302a,b may provide a suitable coupling or fastening location, and allow the optical element 102 to thermally expand/contract without being damaged by an over-restrictive housing 202 or attachment means. In at least one embodiment, one or both of the first and second optical light pipes 302a,b may include an energy absorbing device 314 that may interpose the connection between each flange 208 and its corresponding structural member 312. The energy absorbing device 314 may be an o-ring, for example, or any other energy absorbing pad or material such as elastomers and the like. In operation, the energy absorbing device 314 may be configured to absorb vibrations that the optical light pipes 302a,b may be subjected to during operation. As a result, the optical computing device 300 may be employed in high temperature and high vibration environments while minimizing the risk of failure to the optical light pipes 302a,b.

In one or more embodiments, in addition to or in place of the energy absorbing device 314, the housing 202 for one or both of the optical light pipes 302a,b may be made of a larger or thicker material. Using a thicker, more robust material for the housing 202 may serve to more effectively protect the optical element 102 in harsh environments. Moreover, a larger, more robust housing 202 may be less susceptible to heavy vibration and instead may serve to absorb and/or dampen vibration that would otherwise be transmitted to the optical element 102 and possibly cause damage thereto.

The first optical light pipe 302a may be configured to receive the electromagnetic radiation 310 and transmit the same through the fluid 304 via a first sampling window 316a and a second sampling window 316b arranged opposite the first sampling window 316a on the flow path 306. One or both of the sampling windows 316a,b may be made from a variety of transparent, rigid or semi-rigid materials that are configured to allow transmission of the electromagnetic radiation 310 therethrough. For example, the sampling windows 316a,b may be or include, but are not limited to, glasses, plastics, semi-conductors, sapphires, crystalline materials, polycrystalline materials, hot or cold-pressed powders, combinations thereof, or the like.

Each optical light pipe 302a,b may include the reflective coating 104 (FIGS. 1 and 2) on the outer surface of the optical element 102, as generally described above. As a result, the electromagnetic radiation 310 may be homogenized along the length of each optical element 102, thereby resulting in total internal reflection as the majority (if not all) of the electromagnetic radiation 310 is maintained from one end of each optical light pipe 302a,b to the other. Such total internal reflection may also prove advantageous in preventing any foreign electromagnetic radiation from entering the optical light path and conveying information (e.g., spectral signatures) that does not correspond to the fluid 304. Those skilled in the art will readily appreciate the advantages this may provide, especially in high temperature environments where most physical substances will tend to emit infrared electromagnetic radiation that carries with it a unique spectral signature from any surface that it has optically interacted with. If such foreign electromagnetic radiation is able to interfere with the electromagnetic radiation 310 transmitted through each optical light pipe 302a,b, the resulting signal may be tainted or otherwise rendered erroneous.

As the electromagnetic radiation 310 passes through the fluid 304, it optically interacts with the fluid 304 and generates optically interacted radiation 318 that is directed to or otherwise received by a detection system 320 arranged within the optical train. In one or more embodiments, the detection system 320 may include one or more integrated computational elements (not shown), also known as multivariate optical elements, configured to distinguish and process electromagnetic radiation related to a characteristic of interest of the fluid 304. Additional information regarding integrated computational elements may be found in U.S. Pat. Nos. 6,198,531; 6,529,276; 7,123,844; 7,834,999; 7,911,605; 7,920,258; and 8,049,881, each of which is incorporated herein by reference in its entirety, and U.S. patent application Ser. Nos. 12/094,460; 12/094,465; and 13/456,467, each of which is also incorporated herein by reference in its entirety.

The detection system 320 may further include at least one detector (not shown) configured to receive and quantify the signal carried by the optically interacted radiation 318. The detector may be any device capable of detecting electromagnetic radiation, and may be generally characterized as an optical transducer. In some embodiments, the detector may be, but is not limited to, a thermal detector such as a thermopile or photoacoustic detector, a semiconductor detector, a piezo-electric detector, a charge coupled device (CCD) detector, a video or array detector, a split detector, a photon detector (such as a photomultiplier tube), photodiodes, combinations thereof, or the like, or other detectors known to those skilled in the art. In at least one embodiment, the detector may be configured to produce an output signal 322 in real-time or near real-time in the form of a voltage (or current) that corresponds to a particular characteristic or property of the fluid 304.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. An optical light pipe, comprising:
   a hollow cylindrical housing having opposing first and second housing ends and an inner surface extending between the first and second housing ends;
   an optical element having opposing first and second ends and an outer surface extending between the first and second ends, wherein the optical element is disposed within the inner surface of the housing along an axial length of the optical element, the optical element having a coefficient of thermal expansion that corresponds to that of the housing to reduce a thermal expansion mismatch between the housing and the optical element;
a reflective coating applied to an entire outer surface of the optical element between the first and second ends; and
an energy absorbing layer applied to at least a portion of an outer surface of the reflective coating between the first and second ends to reduce vibration transmission to the optical element, the energy absorbing layer interposed between the housing and the optical element.

2. The optical light pipe of claim 1, wherein the optical element is an optical element selected from the group consisting of a crystal, a lens, a prism, relay optics, and combinations thereof.

3. The optical light pipe of claim 1, wherein the optical element is made of a material selected from the group consisting of calcium fluoride, sapphire, quartz, calcite, diamond, silicon, germanium, zinc selenide, zinc sulfide, crystalline materials, polycrystalline materials, hot or cold-pressed powders, polycarbonate, polymethylmethacrylate, polyvinylchloride, and combinations thereof.

4. The optical light pipe of claim 1, wherein the reflective coating is made from a material selected from the group consisting of gold, silver, aluminum, nickel, chromium, copper, molybdenum, germanium, and combinations thereof.

5. The optical light pipe of claim 4, wherein the material is selected based on a wavelength of electromagnetic radiation transmitted through the optical element.

6. The optical light pipe of claim 1, wherein the reflective coating comprises two layers, each layer being made from a material selected from the group consisting of gold, silver, aluminum, nickel, chromium, copper, molybdenum, germanium, and combinations thereof.

7. The optical light pipe of claim 1, wherein the housing comprises a flange at one of the first and second housing ends, the flange providing a location to couple the optical light pipe to a structural member of an optical computing device.

8. The optical light pipe of claim 7, further comprising an energy absorbing device arranged between the flange and the structural member, the energy absorbing device being configured to reduce vibration to the optical element.

9. The optical light pipe of claim 1, wherein the housing defines one or more windows.

10. The optical light pipe of claim 1, wherein the optical element is secured to the inner surface of the housing with an adhesive.

11. A method of transmitting electromagnetic radiation in an optical light pipe, comprising:
disposing an optical element within an inner surface of a hollow cylindrical housing along an axial length of the optical element, wherein the housing has opposing first and second housing ends and the inner surface extends between the first and second housing ends, wherein the optical element has opposing first and second ends and an outer surface extending between the first and second ends, wherein the optical element has a coefficient of thermal expansion that corresponds to that of the housing to reduce a thermal expansion mismatch between the housing and the optical element;
receiving electromagnetic radiation at a first end of the optical element;
conveying the electromagnetic radiation from the first end to a second end of the optical element;
maintaining the electromagnetic radiation within the optical element with a reflective coating applied to an entire outer surface of the optical element between the first and second ends; and
reducing vibration transmission to the optical element with an energy absorbing layer, the energy absorbing layer being applied to at least a portion of an outer surface of the reflective coating between the first and second ends, the energy absorbing layer being interposed between the housing and the optical element.

12. The method of claim 11, wherein the optical element is made of a material selected from the group consisting of calcium fluoride, sapphire, quartz, calcite, diamond, silicon, germanium, zinc selenide, zinc sulfide, crystalline materials, polycrystalline materials, hot or cold-pressed powders, polycarbonate, polymethylmethacrylate, polyvinylchloride, and combinations thereof.

13. The method of claim 11, wherein the reflective coating is made from a material selected from the group consisting of gold, silver, aluminum, nickel, chromium, copper, molybdenum, germanium, and combinations thereof.

14. The method of claim 13, further comprising selecting the material for the reflective coating based on a wavelength of the electromagnetic radiation that is conveyed through the optical element.

15. The method of claim 11, further comprising bonding the optical element to the inner surface of the housing such that axial and/or rotational movement of the optical element within the housing is substantially prevented.

16. The method of claim 15, wherein bonding the optical element to the inner surface of the housing comprises welding or brazing the optical element to the housing via the reflective coating.

17. The method of claim 15, wherein bonding the optical element to the inner surface of the housing comprises securing the optical element to the housing with an adhesive.

18. The method of claim 11, further comprising coupling the housing to a structural member of an optical computing device via a flange provided on the housing.

19. The method of claim 18, further comprising reducing the vibration transmission to the optical element with an energy absorbing device arranged between the flange and the structural member.

20. The method of claim 11, further comprising relieving thermal stress generated between the optical element and the housing with one or more windows defined in the housing.

* * * * *